US006842180B1

(12) United States Patent
Maiyuran et al.

(10) Patent No.: US 6,842,180 B1
(45) Date of Patent: Jan. 11, 2005

(54) OPPORTUNISTIC SHARING OF GRAPHICS RESOURCES TO ENHANCE CPU PERFORMANCE IN AN INTEGRATED MICROPROCESSOR

(75) Inventors: Subramaniam Maiyuran, Gold River, CA (US); Vivek Garg, Rancho Cordova, CA (US); Jagannath Keshava, Folsom, CA (US); Salvador Palanca, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 444 days.

(21) Appl. No.: 09/665,923

(22) Filed: Sep. 20, 2000

(51) Int. Cl.[7] .............................................. G06F 15/167
(52) U.S. Cl. ........................ 345/541; 711/122; 711/119
(58) Field of Search .............................. 345/552, 541, 345/542, 543, 544, 557, 419; 711/119, 122, 171, 213, 137, 207, 205, 125, 133, 118, 146, 112, 141, 113, 128, 143, 170; 703/11; 709/216

(56) References Cited

U.S. PATENT DOCUMENTS 5,860,095 A * 1/1999 Iacobovici et al. ......... 711/119
6,215,497 B1 * 4/2001 Leung ......................... 345/419
6,295,594 B1 * 9/2001 Meier .......................... 711/171
6,397,296 B1 * 5/2002 Werner ........................ 711/122
6,483,516 B1 * 11/2002 Tischler ....................... 345/552

* cited by examiner

Primary Examiner—Matthew C. Bella
Assistant Examiner—Dalip K. Singh
(74) Attorney, Agent, or Firm—Blakely, Sokoloff, Taylor & Zafman LLP (57) ABSTRACT

An electronic device that has an integrated central processing unit (CPU) including a pre-fetch stride analyzer and an out-of-order engine is provided. The electronic device also has a graphics engine, having graphics memory, that is coupled to the integrated CPU. A main memory that is coupled to a memory controller is provided. The memory controller is also coupled to the CPU and the graphics engine. The device has a host address decoder coupled to the integrated CPU. A front side bus (FSB) is provided that is coupled to the integrated CPU and the host address decoder. Also provided is a plurality of memory components. Accordingly, either the plurality of memory components or the graphics memory can be shared to perform alternate memory functions. Additionally, a method is provided that determines allocation availability between memory components in an integrated computer processing unit. The method also shares an available memory component as a pre-fetch buffer and another available memory component as a victim cache.

28 Claims, 9 Drawing Sheets

OPPORTUNISTIC SHARING OF GRAPHICS RESOURCES TO ENHANCE CPU PERFORMANCE IN AN INTEGRATED MICROPROCESSOR

BACKGROUND OF THE INVENTION

1. Field of the Invention

This invention relates to an apparatus and method of sharing resources in an integrated CPU environment, and more particularly, sharing of unused or underutilized storage components.

2. Background Information

Figure 1:
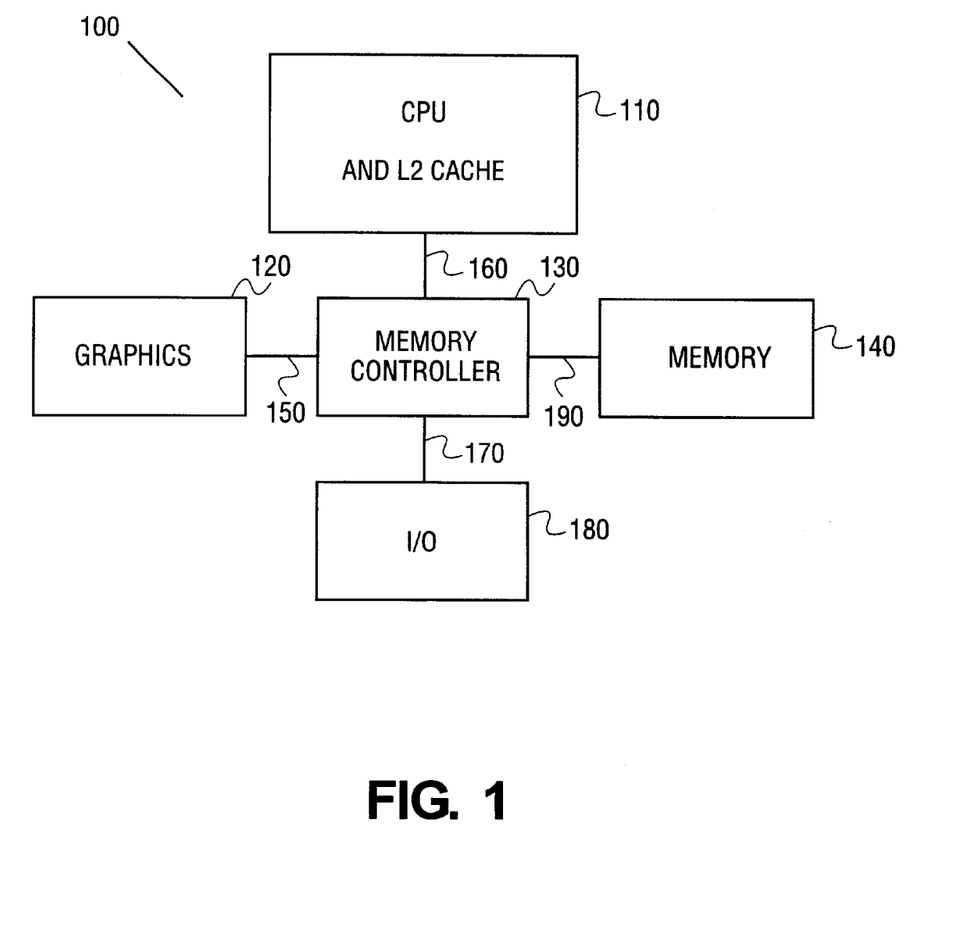
FIG. 1 illustrates a discrete microprocessor set.
Figure 2:
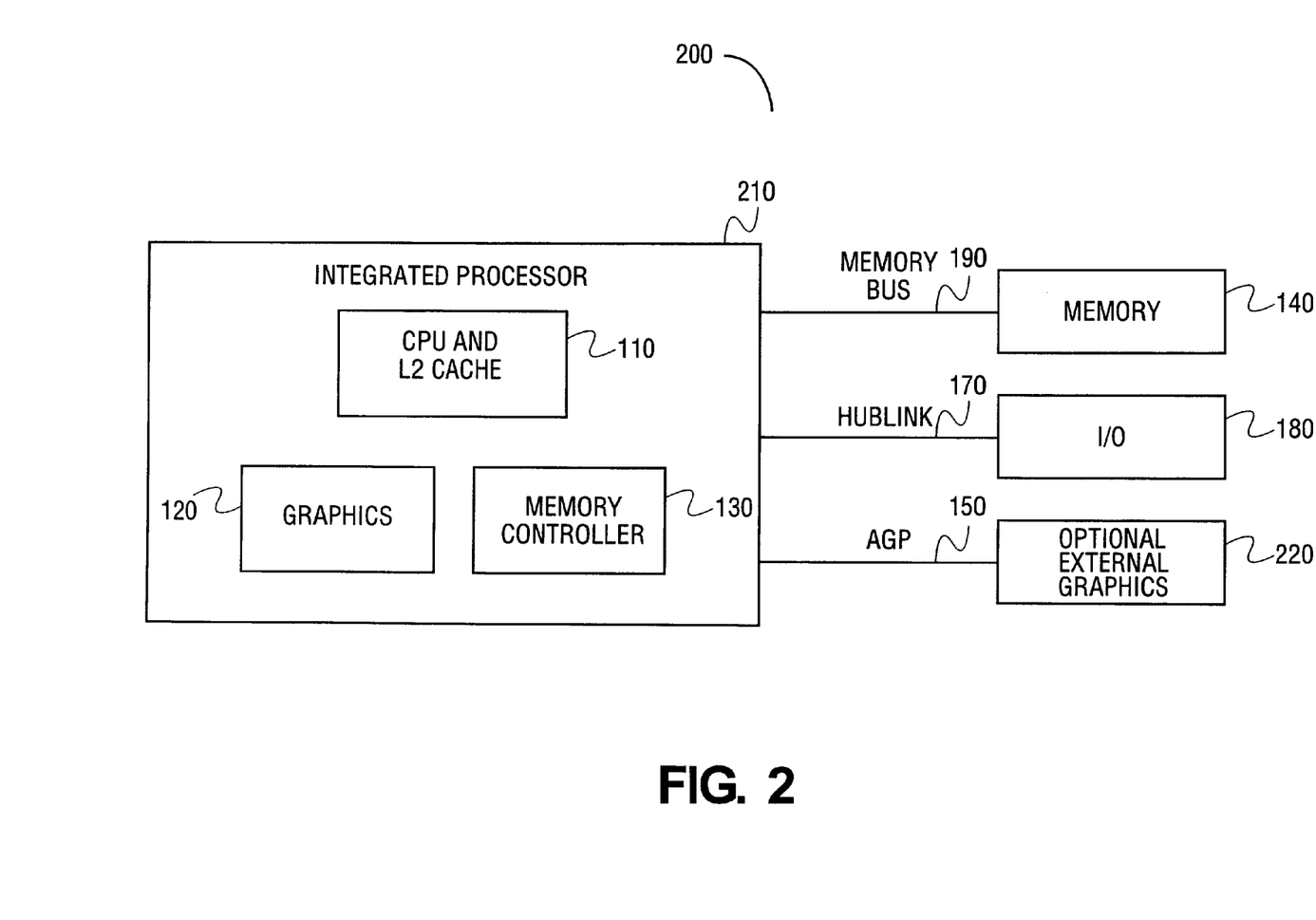
FIG. 2 illustrates an integrated microprocessor set.

With chip manufacturing process technology continuing to improve integration, forming of a complete microprocessor system on a single chip has become very attractive. In the past, microprocessor systems, as illustrated in FIG. 1, have been composed of several discrete chips including processor 110, memory controller 130, I/O controller 180, and various graphics specific chips, such as graphics chip 120. FIG. 2 shows the discrete components in FIG. 1 integrated into processing unit 210.

Integrated CPU's (Central Processing Unit) have various usage models. One usage model, for example, is that of a business user. A business user in this model may use the microprocessor core and two-dimensional (2D) portions of a graphics processor heavily, but may not utilize a three-dimensional (3D) portion of the graphics processor. Another usage model, for example, may be that of a computer enthusiast. The user in this model may wish to upgrade graphics capabilities of a computer system and install an external accelerated graphics port (AGP) graphics card. This user, as a consequence of installing the AGP graphics card, disables the graphics portion of integrated CPU 210. While these examples may be extremes, an average user may also not use all CPU resources at all times. For example, an average user that is "surfing" on the Internet will most likely not be using a 3D portion of the CPU heavily. Also, office productivity suites typically are CPU and memory intensive, but not very 3D graphics intensive. Furthermore, the graphics portion of integrated CPU's tend to be quite gate intensive. Therefore, typical graphics components have lots of memory structures and computational blocks available. Since not all of the memory structures are in use at all times, the memory structure's usage is not optimized.

DETAILED DESCRIPTION

The invention generally relates to a method and apparatus for sharing between integrated components on an integrated microprocessor. Referring to the figures, exemplary embodiments of the invention will now be described. The exemplary embodiments are provided to illustrate the invention and should not be construed as limiting the scope of the invention.

Figure 3:
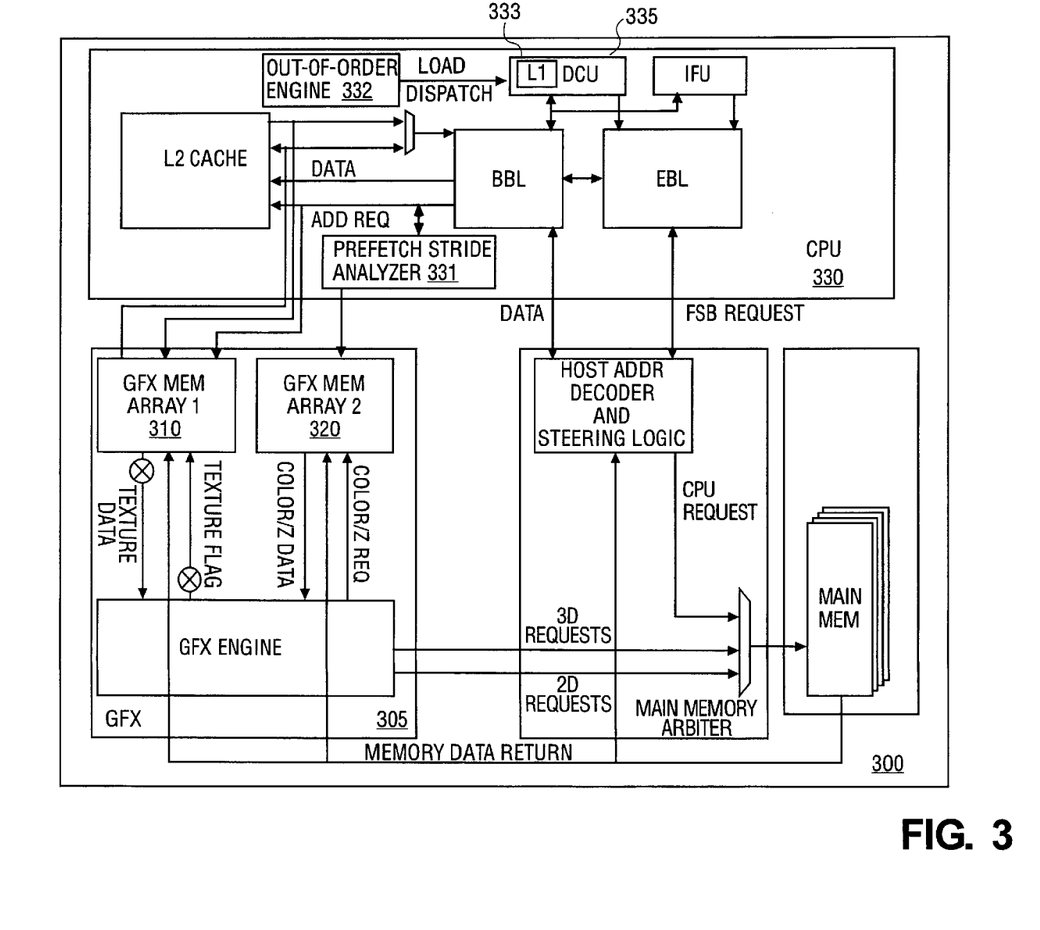
FIG. 3 illustrates an integrated CPU.

Based on integrated components on a microprocessor, under-used resources can be shared to optimize usage. The available resources can be shared in one of two ways: opportunistically via dynamic configuration, or via static configuration. Opportunistic sharing involves time multiplexed sharing of resources for multiple purposes. In other words, under certain scenarios where the resources are under utilized, the resource can be reallocated to enhance the overall performance of the application(s) being processed. The resources being shared under this scheme are dynamically scheduled for one purpose or another. In static resource sharing, the user is required to configure a shared resource to be used in one or another particular way. The user would be required to statically select which configuration is to be used. The configuration in this scheme can be set by any method, for example via a driver. The resources that may be shared, as illustrated in FIG. 3, include graphics memory array-1 310 and graphics memory array-2 320 where both are located in graphics engine 305 of microprocessor 300. Of course, other available memory structures may also be used for sharing.

One embodiment makes use of the sharing of resources by using graphics memory array-1 310 as a victim cache. It should be noted that other memory components could also be shared to perform as a victim cache. A victim cache mechanism allows for a secondary cache that temporarily stores data/instructions being evicted from L2 cache that is integrated with CPU 330. Victim cache typically provides a large performance boost only for specific workloads. Therefore, a typical victim cache is not given high priority for space when integrating components in a microprocessor. This embodiment allows memory structure graphics memory array-1 310 to be used to boost CPU performance by allowing graphics memory array-1 310 to be used by: graphics engine 305, CPU 330, or partitioned between CPU 330 and graphics engine 305, depending upon workloads.

Another embodiment makes use of the sharing of resources by using graphics memory array-2 320 as a pre-fetch buffer. The purpose of a pre-fetch buffer is to take hints from the core regarding the determination of which memory accesses will miss the cache. The pre-fetch buffer will then try and pre-fetch these memory accesses into the pre-fetch buffer. A typical pre-fetch buffer is relatively small in size due to lack of resources available in a memory controller, and the additional expense of placing a large buffer for the optimization of the pre-fetch buffer. This embodiment allows memory structure graphics memory array-2 320 to be used to boost CPU performance by allowing graphics memory array-2 320 to be used by: graphics engine 305, CPU 330, or partitioned between CPU 330 and graphics engine 305, depending upon workloads.

For ease of discussion, an example where a user chose to disable on-chip graphics, by incorporating an external AGP graphics card will be discussed. In this example, since the AGP graphics card will be used instead of the on-chip graphics, the majority of the graphics resources on-chip, namely the caches and computational blocks, are available for sharing. The freed-up graphics resources, graphics memory array-1 310 and graphics memory array-2 320, can be very important for use by microprocessor 300. To optimize unused resources for a pre-fetch buffer or victim cache, memory arrays such as graphics memory array-1 310 and graphics memory array-2 320 need to be configured so that they can be used by graphics engine 305, CPU 330, or partitioned between graphics engine 305 and CPU 330, depending upon workloads. By using the unused available resources, the performance of CPU 330 can be enhanced. Therefore, a benefit can be achieved because even though a designer may not wish to allocate a lot of hardware resources for certain components, such as a victim cache or pre-fetch buffer, CPU optimizations may still be available by sharing available resources. For instance, a graphics render cache having a typical size of 16 KB or larger, may be used as a pre-fetch buffer to fetch ahead cache lines from memory; or as a victim cache in order to buffer the victim cache lines from the L2 cache.

Since CPU-only memory bandwidth requirements do not come close to RDRAM (Rambus Dynamic Random Access Memory) bandwidth, typically only one-half, in another embodiment there is available bandwidth to redirect the pre-fetch traffic to a RDRAM. RDRAM is typically a subsystem comprising a memory, a memory controller, and a bus connecting the memory to a CPU and other devices in a computer system that uses the CPU.

In another embodiment, the operating system (OS) or user can determine how to share resources to optimize performance of a computer system. Sharing heuristics can be implemented in the form of counters using bus traffic information, or other information such as cache hit or miss data. The OS can poll the counters periodically and based on the counter, then determine an efficient allocation of resources. Instead of the OS, a driver can also be used to poll the counters.

Figure 4:
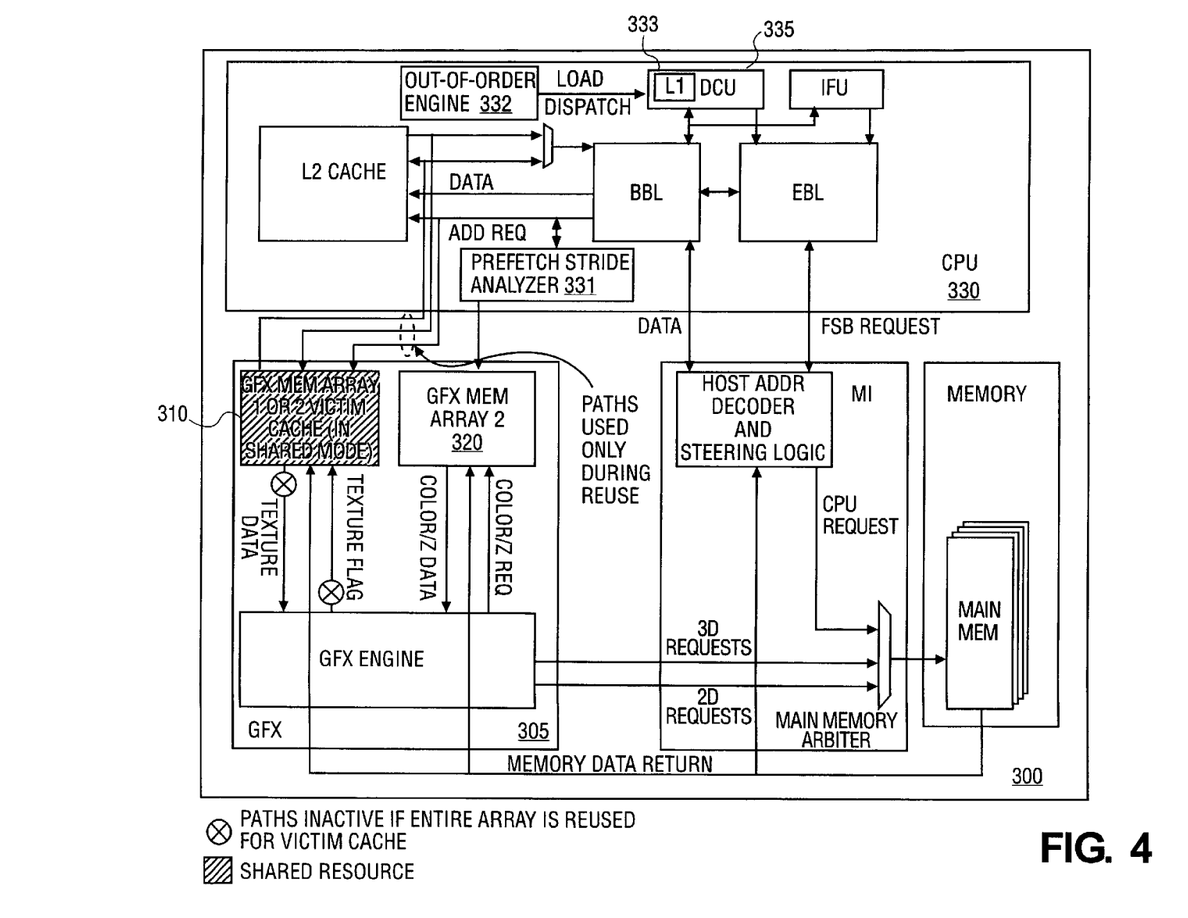
FIG. 4 illustrates an embodiment of the invention with sharing of a graphics memory array for use as a victim cache in an integrated CPU.

FIG. 4 illustrates portions of graphics engine 305 available for reuse. Graphics memory array-1 310 and graphics memory array-2 320 may be components of graphics engine 305, such as a render cache and a texture cache. Various pathways in memory and L2 are illustrated to show connectivity with graphics memory array-1 310 and graphics memory array-2 320 to enable sharing. Specifically, graphics memory array-1 310 is illustrated in FIG. 4 as being shared for use as a victim cache. To accomplish sharing of graphics memory array-1 310 as a victim cache, graphics memory array-1 310 needs to have data and an address path to the L2 cache, which is integrated with CPU 330. Also integrated in CPU 330 is pre-fetch stride analyzer 331 and out-of-order engine 332. Any data that is evicted from the L2 cache is stored in victim cache (graphics memory array-1 310). L2 cache misses are looked up in the victim cache (graphics memory array-1 310) to determine if it is a hit or a miss. Memory access can proceed in parallel or in series to the victim cache lookup, depending on implementation.

Figure 5:
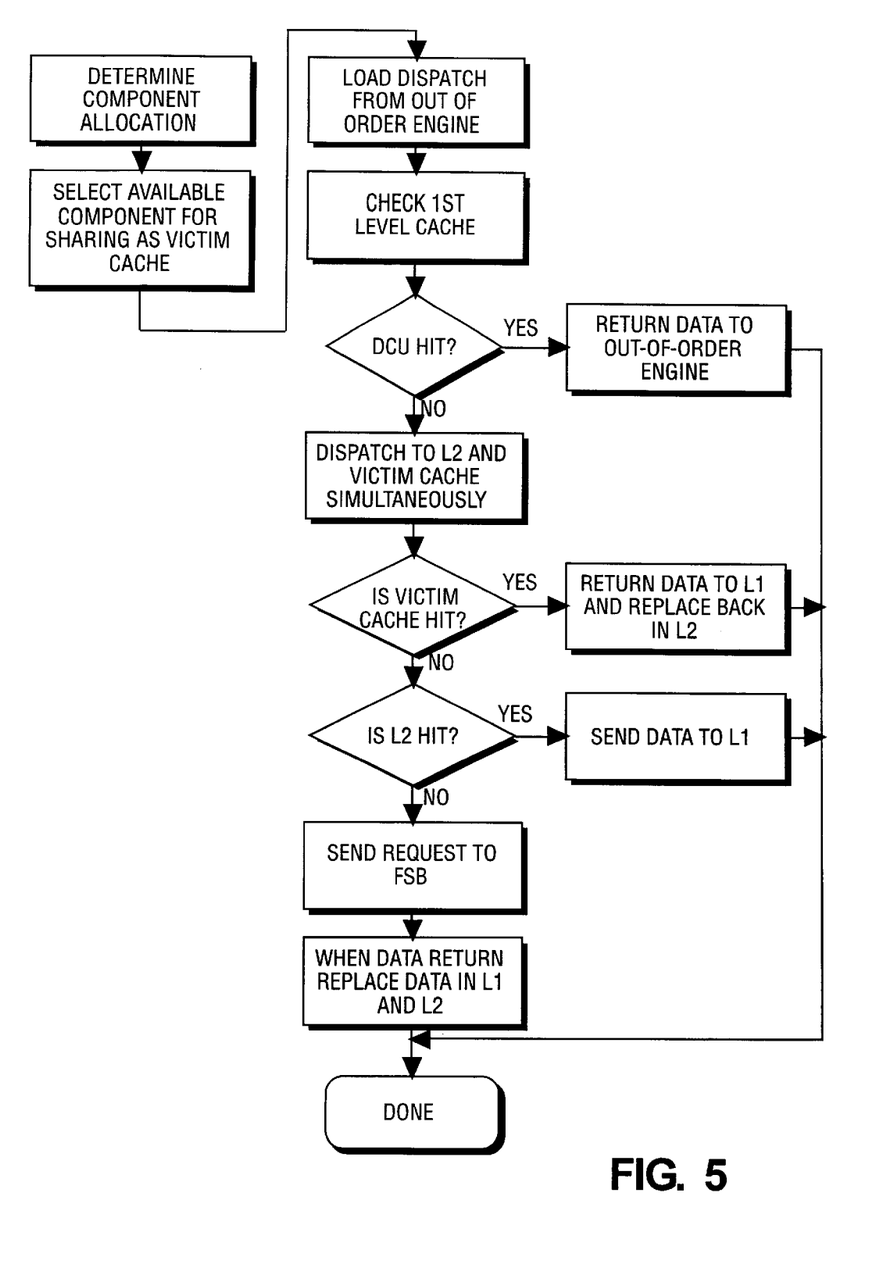
FIG. 5 illustrates a block diagram showing a method of the sharing of a graphics memory array for use as a victim cache in an integrated CPU.

FIG. 5 illustrates a block diagram flow of an embodiment illustrated in FIG. 4. First, component allocation is determined. Next, an available or underused memory component, such as an available graphics memory array, is selected for sharing-as a victim cache. It should be noted that other available memory components could also be shared as a victim cache. The dispatch is then loaded from the out-of-order engine 332. Level 1 (L1) cache 333 is then checked for data. If DCU (data cache unit) 335 has a hit, then data is returned to the out-of-order engine 332. If DCU 335 does not have a hit, then data is dispatched to L2 cache and victim cache simultaneously, where graphics memory array-1 310 is now being shared as victim cache. If victim cache 310 is hit, then data is returned to L1 333 and placed back in L2. If victim cache 310 and L2 cache are not hit, then request is sent to the FSB (front side bus). Upon the data returning from the FSB, the data is replaced in L2 333 and L1.

Figure 6:
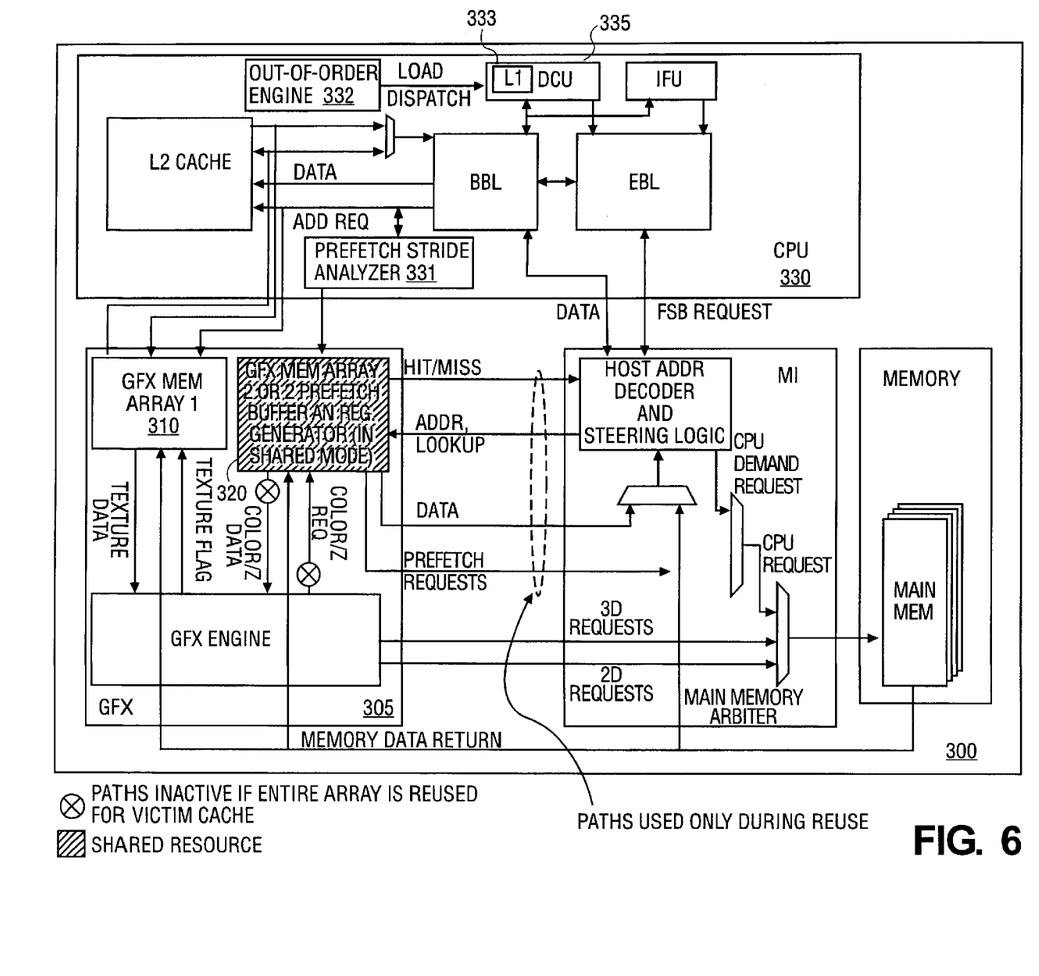
FIG. 6 illustrates an embodiment of the invention with sharing of a graphics memory array for use as a pre-fetch buffer in an integrated CPU.

FIG. 6 illustrates reuse of graphics memory array-2 320 as a pre-fetch buffer. Pre-fetch requests from pre-fetch buffer (graphics memory array-2 320) arbitrate for access to memory along with CPU 330, 2D and 3D requests. Since the CPU only-memory bandwidth is small compared to the total available memory bandwidth, there is a large amount of bandwidth available for prefetching data to the pre-fetch buffer, where graphics memory array-2 320 is being shared as the pre-fetch buffer. Any CPU 330 requests are checked in the pre-fetch buffer 320 to get a hit/miss status. The protocols used and the arbitration policies are dependent upon implementation.

Figure 7:
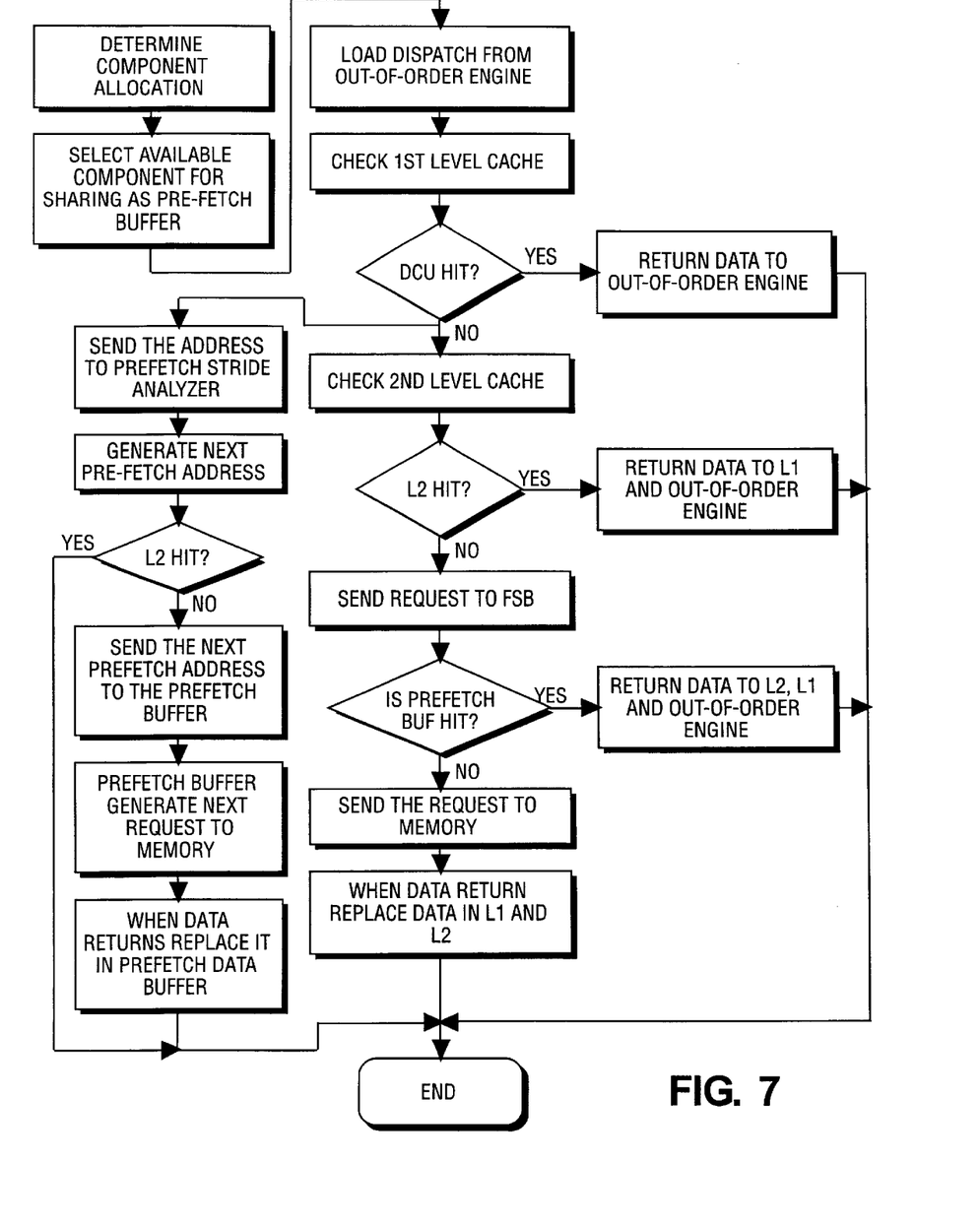
FIG. 7 illustrates a block diagram showing a method of sharing a graphics memory array for use as a pre-fetch buffer in an integrated CPU.

FIG. 7 illustrates a block diagram flow of an embodiment illustrated in FIG. 6. First, component allocation is determined. Next, an available or underused memory component, such as an available graphics memory array, is selected for sharing as a pre-fetch buffer. It should be noted that other available memory components could also be shared as a pre-fetch buffer. The dispatch is then loaded from the out-of-order engine 332. L1 cache 333 is then checked for data. If DCU 335 is determined to have a hit, data is returned to out-of-order engine 332. If DCU 335 is determined to not have a hit, then the address is sent to pre-fetch stride analyzer 331 and L2 cache is checked for data. A next pre-fetch address is generated. If L2 cache does not have a hit, the next pre-fetch address is sent to the pre-fetch buffer, where graphics memory array-2 320 is being shared as the pre-fetch buffer. After the next pre-fetch address is sent, pre-fetch buffer 320 generates the next request to main memory. After the data is returned from main memory, the data is replaced in pre-fetch data buffer 320.

After L2 is checked, it is determined whether L2 cache is hit. If L2 cache is determined to be a hit, the data is returned to L1 333 and to out-of-order engine 332. If it is determined that L2 is not hit, then a request is sent to the FSB. After the request to the FSB is sent, it is determined whether pre-fetch buffer 320 is hit. If pre-fetch buffer 320 is hit, data is returned to L2, L1 333 and out-of-order engine 331. If pre-fetch buffer 320 is determined to be a miss, a request to main memory is sent. Upon the data being returned from main memory, data is replaced in L1 333 and L2.

Figure 8:
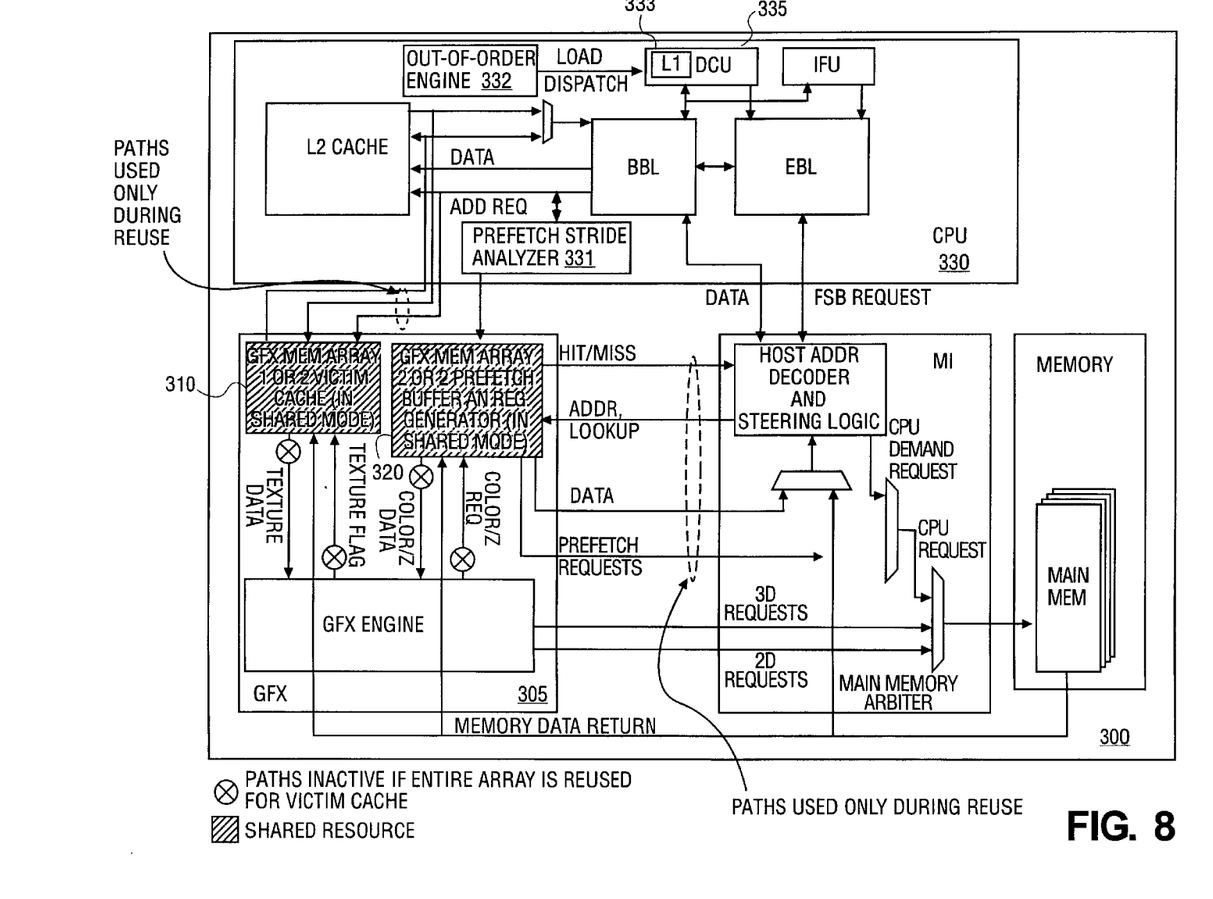
FIG. 8 illustrates an embodiment of the invention with sharing of two graphics memory arrays for use as a victim cache and a pre-fetch buffer in an integrated CPU.

FIG. 8 illustrates reuse of graphics memory array-1 310 as a victim cache and graphics memory array-2 320 as a pre-fetch buffer. The effective memory hierarchy is increased by one more level: by either reuse of graphics memory array-1 310 as a victim cache, or graphics memory array-2 320 as a pre-fetch buffer. In this embodiment, the chances of not having to access core memory are increased, thus improving CPU 330 performance.

Figure 9:
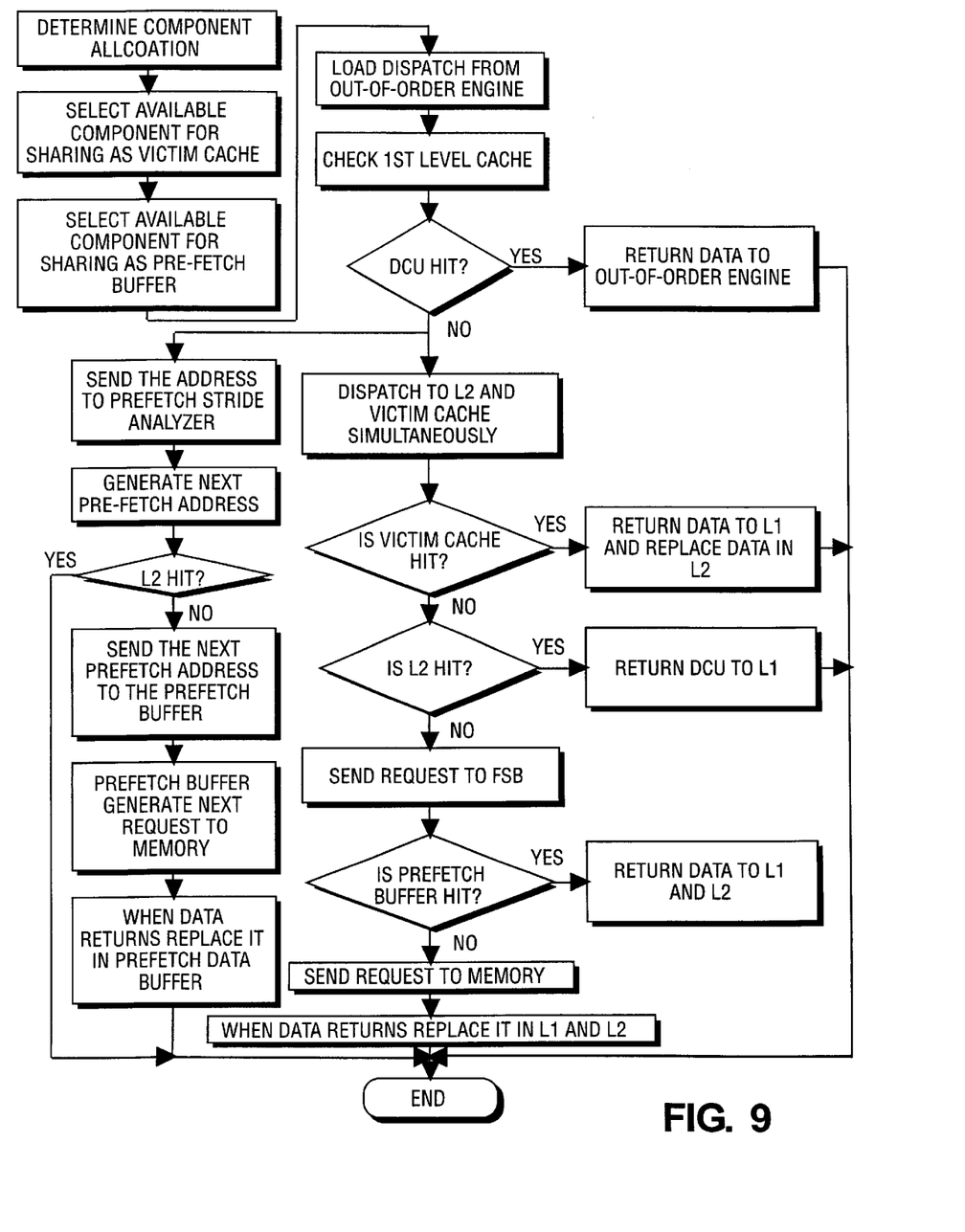
FIG. 9 illustrates a block diagram showing a method of sharing of two graphics memory arrays for use as a victim cache and a pre-fetch buffer in an integrated CPU.

FIG. 9 illustrates a block diagram flow of an embodiment illustrated in FIG. 8. First, component allocation is determined. Next, an available or underused memory component, such as an available graphics memory array, is selected for sharing as a victim cache. Then, an available or underused memory component, such as another available graphics memory array, is selected for sharing as a pre-fetch buffer. It should be noted that other memory components could be shared as a victim cache or a pre-fetch buffer. Then, the dispatch is loaded from the out-of-order engine 332. L1 cache 333 is then checked for data. If DCU 335 is determined to have a hit, data is returned to out-of-order engine 332. If DCU 335 is determined to not have a hit, then the address is sent to pre-fetch stride analyzer 331 and dispatched to L2 and victim cache simultaneously, where graphics memory array-1 310 is being shared as victim cache. A next pre-fetch address is generated. If L2 does not have a hit, the next pre-fetch address is sent to the pre-fetch buffer, where graphics memory array-2 320 is being shared as a pre-fetch buffer. After the next pre-fetch address is sent, pre-fetch buffer 320 generates the next request to memory. After the data is returned from memory, the data is replaced in pre-fetch data buffer 320.

After data is dispatched to L2 and victim cache 310 simultaneously, it is determined whether victim cache 310 is hit. If victim cache 310 is determined to be a hit, the data is returned to L1 333 and data in L2 is replaced. If it is determined that victim cache 310 is not hit, then it is determined whether L2 cache is hit. If L2 cache is hit, then data is returned to L1 333. If it is determined that L2 cache is not hit, then a request is sent to the FSB. After the request to the FSB is sent, it is determined whether pre-fetch buffer 320 is hit. If pre-fetch buffer 320 is hit, data is returned to L2, L1 333. If pre-fetch buffer 320 is determined to be a miss, a request to main memory is sent. Upon the data being returned from main memory, data is replaced in L1 333 and L2.

The foregoing embodiments increase CPU 330 performance in an integrated CPU environment. One advantage is providing higher CPU performance for a lower cost. The usage model of a system can vary from user to user and application to application. This typically will result in idle or underutilized resources. Therefore, in an integrated CPU environment, embodiments of the invention are used to statically or dynamically reuse the idle or underutilized resources, thus improving/optimizing performance. The reuse of resources also allows flexibility in tuning performance of an integrated system without having to invest in a lot of dedicated hardware resources.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   an integrated central processing unit (CPU) having a pre-fetch stride analyzer and an out-of-order engine,
   a victim cache memory coupled to said CPU,
   a pre-fetch buffer coupled to said CPU,
   a graphics engine having a first graphics memory and a second graphics memory coupled to the integrated CPU,
   a main memory coupled to a memory controller, wherein the memory controller is coupled to the CPU and the graphics engine,
   a host address decoder coupled to the integrated CPU,
   a front side bus (FSB) coupled to the integrated CPU and the host address decoder, and
   a plurality of memory components,
   wherein one of the first graphics memory, the second graphics memory, and both the first graphics memory and the second graphics memory can be used by said CPU to perform as said victim cache memory and said pre-fetch buffer in addition to said victim cache memory and said pre-fetch buffer, where said first graphics memory and said second graphics memory increase memory size available for said victim cache and said pre-fetch buffer.

2. The apparatus of claim 1, wherein one of the first graphics memory and the second graphics memory can be used as a pre-fetch buffer.

3. The apparatus of claim 1, wherein one of the first graphics memory and the second graphics memory can be used as a victim cache.

4. The apparatus of claim 1, wherein the first graphics memory and the second graphics memory can be used as a victim cache and a pre-fetch buffer.

5. The apparatus of claim 1, wherein the first graphics memory and the second graphics memory can be used as one of a victim cache, a pre-fetch buffer, and a victim cache and a pre-fetch buffer dynamically.

6. The apparatus of claim 5, wherein one of the first graphics memory, the second graphics memory, and both the first graphics memory and the second graphics memory is shared dynamically based on a counter that is polled by an operating system to determine the allocation of the first graphics memory, the second graphics memory, and the first graphics memory and the second graphics memory.

7. The apparatus of claim 5, wherein one of the first graphics memory, the second graphics memory, and the first graphics memory and the second graphics memory is shared dynamically based on a counter that is polled by a driver to determine the allocation of one of the first graphics memory, the second graphics memory, and the first graphics memory and the second graphics memory.

8. The apparatus of claim 1, wherein one of the first graphics memory and the second graphics memory can be shared statically.

9. A system comprising:
   an integrated processor having a central processing unit (CPU) having
   a victim cache memory and a pre-fetch buffer, a plurality of memory components, a graphics processing unit, and a memory controller, wherein the graphics processing unit having a first graphics memory and a second graphics memory,
   an input/output processor coupled to the integrated processor by a hublink,
   an external graphics processor coupled to the integrated processor by an accelerated graphics port (AGP), and
   a memory structure coupled to the integrated processor by a bus,
   wherein one of the first graphics memory, the second graphics memory, and the first graphics memory and the second graphics memory can be used by said CPU to perform as said victim cache memory and said pre-fetch buffer in addition to said victim cache memory and said pre-fetch buffer, where said first graphics memory and said second graphics memory increase memory size available for said victim cache and said pre-fetch buffer.

10. The system of claim 9, wherein one of the first graphics memory, the second graphics memory, and the first graphics memory and the second graphics memory can be used as a pre-fetch buffer.

11. The system of claim 9, wherein one of the first graphics memory, the second graphics memory, and the first graphics memory and the second graphics memory can be used as a victim cache.

12. The system of claim 9, wherein one of the first graphics memory, the second graphics memory, and the first graphics memory and the second graphics memory can be used as a victim cache and a pre-fetch buffer.

13. The system of claim 9, wherein one of the first graphics memory, the second graphics memory, and the first graphics memory and the second graphics memory can be used as one of a victim cache, a pre-fetch buffer, and a victim cache and a pre-fetch buffer dynamically.

14. The system of claim 13, wherein one of the first graphics memory, the second graphics memory, and the first graphics memory and the second graphics memory is shared dynamically based on a counter that is polled by an operating system to determine the allocation of one of the first graphics memory, the second graphics memory, and the first graphics memory and the second graphics memory.

15. The system of claim 13, wherein one of the first graphics memory, the second graphics memory, and the first graphics memory and the second graphics memory is shared dynamically based on a counter that is polled by a driver to determine the allocation of one of the first graphics memory, the second graphics memory, and the first graphics memory and the second graphics memory.

16. The system of claim 9, wherein one of the first graphics memory, the second graphics memory, and the first graphics memory and the second graphics memory can be shared statically.

17. A method comprising: determining allocation availability between memory components in an integrated computer processing unit and a graphics processing unit, and using an available memory component in the graphics processing unit as a victim cache for the integrated computer processing unit in addition to a victim cache in the integrated computer processing unit, where said available memory component increases memory size available for said victim cache in the integrated computer processing unit.

18. The method of claim 17, further comprising:
loading dispatch data request from an out of order engine,
checking a level one cache for data,
returning data to the out of order engine if a data cache unit has a hit,
if the data cache unit has a miss,
dispatching data request to a level two cache and to the available memory component used as a victim cache simultaneously,
returning data to the level one cache and replacing data into the level two cache if the available memory component used as a victim cache has a hit,
if the available memory component used as a victim cache has a miss,
sending data to the level one cache if the level two cache has a hit,
if the level two cache has a miss,
sending a request to a front side bus rep lacing data in the level one cache and the level two cache upon data returning from the front side bus.

19. The method of claim 17, wherein the step of using the available memory component as a victim cache is determined by one of dynamically and statistically.

20. The method of claim 17, wherein the available memory component used as a victim cache is a graphics memory array.

21. A method comprising: determining allocation availability between memory components in an integrated computer processing unit and a graphics processing unit, and using an available memory component in; the graphic processing unit as a pre-fetch buffer for the integrated computer processing to perform as a pre-fetch buffer in addition to a pre-fetch buffer in the integrated computer processing unit, where said available memory increases memory size available for said pre-fetch buffer in the integrated computer processing unit.

22. The method of claim 21, further comprising:
loading dispatch data request from an out of order engine,
checking a first level cache for data,
returning data to the out of order engine if a data cache unit has a hit,
if the data cache unit has a miss,
sending a data address to a pre-fetch stride analyzer,
generating a request to a memory from the available memory component used as a pre-fetch buffer,
replacing returned data from the memory in the available memory component used as a pre-fetch buffer,
returning data to the first level cache and the out of order engine if a second level cache has a hit,
if the second level cache has a miss,
sending a request to a front side bus,
returning data to the second level cache, the first level cache, and the out of order engine if the available memory component used as a pre-fetch buffer has a hit,
if the available memory component used as a pre-fetch buffer has a miss,
sending a request to the memory,
upon data returning from the memory, replacing returned data in the second level cache and the first level cache.

23. The method of claim 21, wherein the step of using the available memory component as a pre-fetch buffer is determined by one of dynamically and statically.

24. The method of claim 21, wherein the available memory component used as a pre-fetch buffer is a graphics memory array.

25. The method of claim 21, further comprising:
sharing another available memory component in the graphics processing unit as a victim cache.

26. The method of claim 25, further comprising:
loading dispatch data from an out of order engine,
returning data to the out of order engine if a data cache unit has a hit,
if the data cache unit has a miss,
sending a data address to a pre-fetch stride analyzer,
generating a next pre-fetch buffer address,
sending a next data address to the available memory component used as a pre-fetch buffer if a second level cache is not hit,
generating a next data request to a main memory,
upon data returning from the main memory, replacing returned data from a memory in the available memory component used as a pre-fetch buffer,
dispatching data to the second level cache and the other available memory component used as a victim cache simultaneously,
returning data to a first level cache and replacing data in the second level cache if the other available memory component used as a victim cache has a hit,
if the other available memory component used as a victim cache has a miss,
returning data to the first level cache if the second level cache has a hit, returning data to the second level cache and the first level cache if the available memory component used as a pre-fetch buffer has a hit, if the available memory component used as a pre-fetch buffer has a miss, if the available memory component used as pre-fetch buffer has a hit, replacing returned data in the second level cache and the first level cache.

27. The method of claim 25, wherein the step of using the other available memory component as a victim cache is determined by one of dynamically and statically.

28. The method of claim 25, wherein the other available memory component used as a victim cache is a graphics memory array.

* * * * *

UNITED STATES PATENT AND TRADEMARK OFFICE
CERTIFICATE OF CORRECTION

PATENT NO. : 6,842,180 B1
DATED : January 11, 2005
INVENTOR(S) : Maiyuran et al.

It is certified that error appears in the above-identified patent and that said Letters Patent is hereby corrected as shown below:

Column 5,
Line 57, after "CPU", delete "," and insert -- ; --

Column 7,
Line 56, delete "rep lacing" and insert -- replacing --.

Signed and Sealed this

Twenty-fourth Day of May, 2005

JON W. DUDAS
*Director of the United States Patent and Trademark Office*